(12) United States Patent
Kobayashi et al.

(10) Patent No.: US 10,923,924 B2
(45) Date of Patent: Feb. 16, 2021

(54) POWER SUPPLY DEVICE OF VEHICLE

(71) Applicant: TOYOTA JIDOSHA KABUSHIKI KAISHA, Toyota (JP)

(72) Inventors: Shunya Kobayashi, Gotemba (JP); Yoshitaka Niimi, Susono (JP); Naoyoshi Takamatsu, Sunto-gun (JP); Satoru Ito, Numazu (JP); Takuya Sakamoto, Susono (JP); Hirotsugu Ohata, Susono (JP); Naoki Yanagizawa, Nagakute (JP); Shuji Tomura, Nagakute (JP); Shigeaki Goto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/655,805

(22) Filed: Oct. 17, 2019

(65) Prior Publication Data
US 2020/0127472 A1    Apr. 23, 2020

(30) Foreign Application Priority Data

Oct. 18, 2018 (JP) ................... 2018-196607

(51) Int. Cl.
| | |
|---|---|
| *B60R 16/033* | (2006.01) |
| *H01M 10/44* | (2006.01) |
| *H02J 7/00* | (2006.01) |
| *H01M 10/42* | (2006.01) |
| *B60L 58/19* | (2019.01) |

(52) U.S. Cl.
CPC ............ *H02J 7/0027* (2013.01); *B60L 58/19* (2019.02); *B60R 16/033* (2013.01);
(Continued)

(58) Field of Classification Search
CPC ........ B60R 16/033; B60L 58/00; B60L 58/10; B60L 58/12–16; B60L 58/18–22;
(Continued)

(56) References Cited

U.S. PATENT DOCUMENTS

| | | | |
|---|---|---|---|
| 8,994,212 B2 | 3/2015 | Kurokawa et al. | |
| 2009/0167216 A1* | 7/2009 | Soma | B60L 7/14 318/376 |

(Continued)

FOREIGN PATENT DOCUMENTS

| | | |
|---|---|---|
| JP | 2010-259274 A | 11/2010 |
| JP | 2014-003858 A | 1/2014 |

*Primary Examiner* — Levi Gannon
(74) *Attorney, Agent, or Firm* — Sughrue Mion, PLLC

(57) ABSTRACT

A power supply device of a vehicle includes a negative electrode terminal connected to a first battery; a positive electrode terminal connected to a second battery; a first positive electrode side relay between a first node and the first battery; a first capacitor connected between the first node and a negative line; a first negative electrode side relay between the first battery and the negative line; a first precharge relay and a first resistive element connected in parallel with the first negative electrode side relay; a second positive electrode side relay between a third node and the second battery; a second capacitor between the third node and a second node; a second negative electrode side relay between the second battery and the second node; and a second precharge relay and a second resistive element connected in parallel with the second positive electrode side relay.

3 Claims, 4 Drawing Sheets

(52) U.S. Cl.
CPC ....... *H01M 10/4264* (2013.01); *H01M 10/44* (2013.01); *H01M 10/441* (2013.01); *H02J 7/0024* (2013.01); *H01M 2010/4271* (2013.01); *H01M 2220/20* (2013.01)

(58) Field of Classification Search
CPC ............. H01M 10/4264; H01M 10/44; H01M 10/441; H01M 10/443; H01M 2010/4271; H01M 2220/20; H02J 1/10; H02J 7/0013; H02J 7/0024; H02J 7/0027; H02J 7/0048; H02J 7/007; H02J 2207/20
See application file for complete search history.

(56) References Cited

U.S. PATENT DOCUMENTS

| | | | |
|---|---|---|---|
| 2010/0038962 A1* | 2/2010 | Komatsu | B60L 50/16 307/10.1 |
| 2010/0060080 A1* | 3/2010 | Sawada | B60W 20/00 307/48 |
| 2010/0123989 A1* | 5/2010 | Kosaki | B60L 15/007 361/93.9 |
| 2010/0138087 A1* | 6/2010 | Takaoka | B60L 3/0053 701/22 |
| 2010/0244558 A1* | 9/2010 | Mitsutani | B60K 6/365 307/9.1 |
| 2010/0296204 A1* | 11/2010 | Ichikawa | B60K 6/445 361/15 |
| 2011/0288710 A1* | 11/2011 | Ito | B60L 58/20 701/22 |
| 2014/0111120 A1* | 4/2014 | Mitsutani | H02H 9/001 318/139 |
| 2014/0203633 A1* | 7/2014 | Nishi | H02J 7/00 307/10.1 |
| 2014/0225430 A1* | 8/2014 | Oyobe | H02J 1/08 307/9.1 |
| 2016/0079751 A1* | 3/2016 | Ide | H02J 7/342 307/52 |

* cited by examiner

POWER SUPPLY DEVICE OF VEHICLE

CROSS-REFERENCE TO RELATED APPLICATION(S)

The present application claims priority to and incorporates by reference the entire contents of Japanese Patent Application No. 2018-196607 filed in Japan on Oct. 18, 2018.

BACKGROUND

The present disclosure relates to a power supply device of a vehicle.

Japanese Laid-open Patent Publication No. 2014-003858 discloses a power supply device including two batteries of which a connection state is switched between a series connection state and a parallel connection state by controlling switching elements, and a reactor element which is connected in series to one of the two batteries.

SUMMARY

There is a need for providing a power supply device of a vehicle in which a battery can be charged by an external charger while occurrence of inrush current at the time of connection is suppressed without depending on a connection state.

According to an embodiment, a power supply device of a vehicle, which includes a first switching element connected between a positive line and a first node, a second switching element connected between the first node and a second node, a third switching element connected between the second node and a negative line, a first battery having a positive electrode and a negative electrode respectively connected to the first node and the negative line, a reactor element connected between the positive line and a third node, a second battery having a positive electrode and a negative electrode respectively connected to the third node and the second node, and a smoothing capacitor connected between the positive line and the negative line, and switches an on/off state of the first switching element, the second switching element, and the third switching element to switch a connection state of the first battery and the second battery between a series connection state and a parallel connection state. Further, the power supply device includes: a negative electrode terminal for external charging connected to the negative electrode of the first battery; a positive electrode terminal for external charging connected to the positive electrode of the second battery; a first positive electrode side relay provided between the first node and the positive electrode of the first battery; a first capacitor connected between the first node and the negative line; a first negative electrode side relay provided between the negative electrode of the first battery and the negative line; a first precharge relay and a first resistive element which are connected in parallel with the first negative electrode side relay; a second positive electrode side relay provided between the third node and the positive electrode of the second battery; a second capacitor connected between the third node and the second node; a second negative electrode side relay provided between the negative electrode of the second battery and the second node; and a second precharge relay and a second resistive element which are connected in parallel with the second positive electrode side relay.

DETAILED DESCRIPTION

The power supply device disclosed in Japanese Laid-open Patent Publication No. 2014-003858 is provided without considering charging with an external charger. Specifically, in the power supply device disclosed in Japanese Laid-open Patent Publication No. 2014-003858, even when the connection state of the two batteries is either the series connection state or the parallel connection state, connection points of the external charger at which the external charger can charge the two batteries are not sufficiently considered. In addition, a technique for suppressing an occurrence of inrush current at the time of connecting the external charger is not considered. Therefore, a sufficient consideration of a power supply device in which external charging of a battery by an external charger is desired.

Hereinafter, a configuration of a power supply device of a vehicle as an embodiment of the present disclosure will be described with reference to the drawings.

Configuration of Vehicle

First, a configuration of a vehicle to which a power supply device of a vehicle as according to an embodiment of the present disclosure is applied will be described with reference to FIG. 1.

Figure 1:
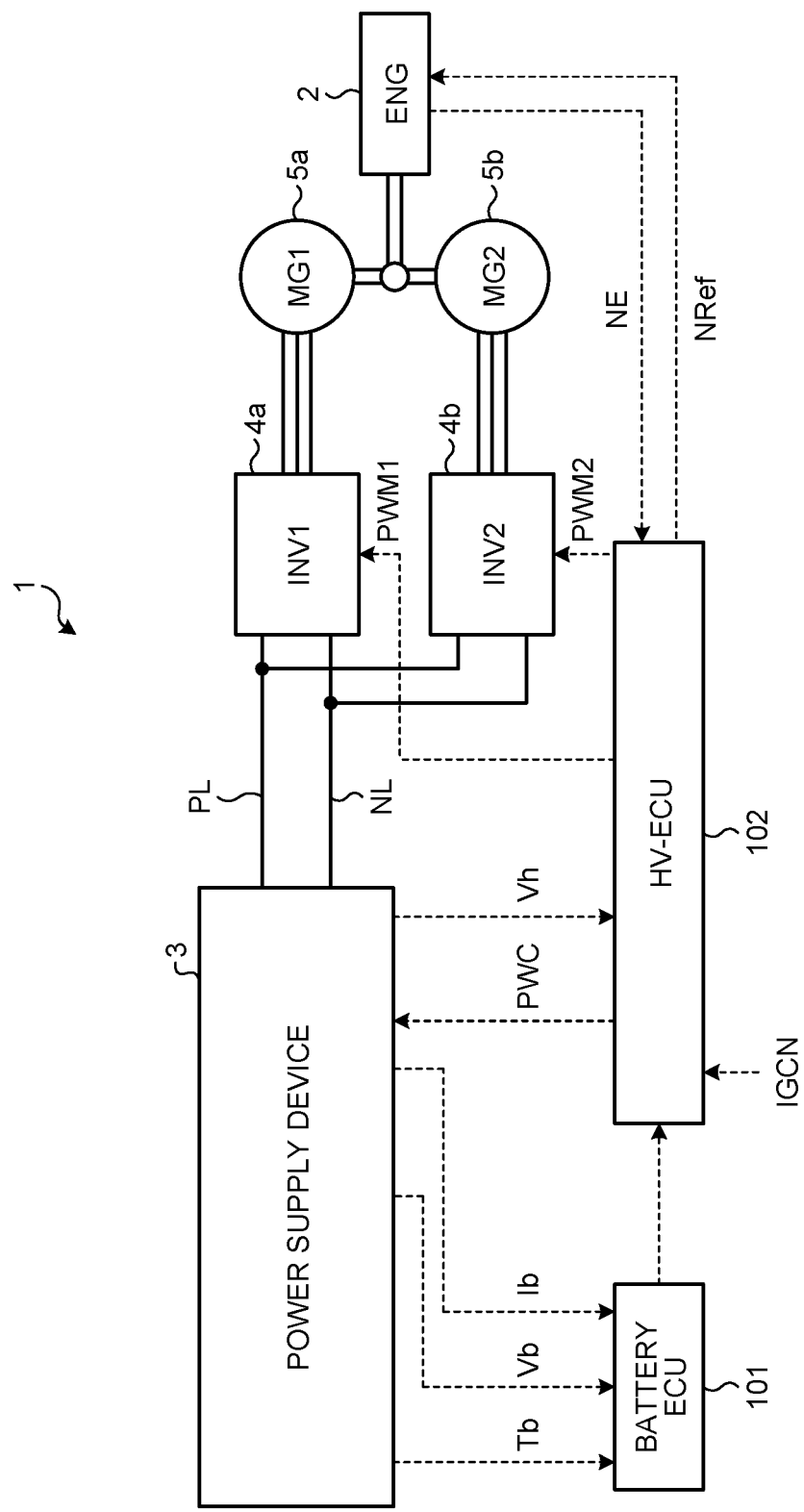
FIG. 1 is a block diagram illustrating an example configuration of a vehicle to which a power supply device of a vehicle as according to an embodiment of the present disclosure is applied.

FIG. 1 is a block diagram illustrating an example configuration of a vehicle to which the power supply device of a vehicle according an embodiment of the present disclosure is applied. As illustrated in FIG. 1, a vehicle 1 to which the power supply device of a vehicle as an embodiment of the present disclosure is applied is constituted of a hybrid vehicle (HV), and includes an engine (ENG) 2, a power supply device 3, a first inverter (INV1) 4a, a second inverter (INV2) 4b, a first electric motor (MG1) 5a, and a second electric motor (MG2) 5b. The vehicle 1 is not limited to the HV, and may be an electric vehicle (EV), a plug-in hybrid vehicle (PHV), a fuel cell electric vehicle (FCEV) or the like.

The engine 2 is constituted of an internal combustion engine which outputs power by using gasoline or light oil as fuel, and is controlled to be driven by an HV electronic control unit (hereinafter, referred to as an "HV-ECU") 102.

The power supply device 3 is connected to the first inverter 4a and the second inverter 4b via a positive line PL and a negative line NL, and is controlled by a battery electronic control unit (hereinafter, referred to as a "battery ECU") 101.

The first inverter 4a and the second inverter 4b include a plurality of switching elements, and have a function of mutually converting direct current power and alternating current power. By an on/off control of the switching elements by the HV-ECU 102, the first inverter 4a and the second inverter 4b convert direct current power supplied from the power supply device 3 into alternating current power to supply the alternating current power to the first electric motor 5a and the second electric motor 5b, respectively, and convert alternating current power generated by the first electric motor 5a and the second electric motor 5b into direct current power to supply the direct current power to the power supply device 3.

The first electric motor 5a and the second electric motor 5b are constituted of a synchronous generator-motor. Each of the first electric motor 5a and the second electric motor 5b functions as an electric motor for vehicle driving, by being driven by the alternating current power supplied from the first inverter 4a and the second inverter 4b, and functions as a generator that generates alternating current power using driving power of the vehicle 1.

The vehicle 1 of FIG. 1 includes the battery ECU 101 and the HV-ECU 102 as a control system.

The battery ECU 101 mainly performs a voltage control, abnormality detection, and management of a charging state of the power supply device 3. Various electric signals such as an electric signal representing a temperature Tb of each battery constituting the power supply device 3, an electric signal representing a voltage difference Vb between the positive line PL and the negative line NL in the power supply device 3, and an electric signal representing a current Ib flowing through the positive line PL in the power supply device 3 are input to the battery ECU 101. The battery ECU 101 calculates a state of charge (SOC) of each battery constituting the power supply device 3 on the basis of the temperature Tb, the voltage difference Vb, the current Ib and the like. The battery ECU 101 transmits various signals of the temperature Tb, the SOC and the like to the HV-ECU 102. In addition, the battery ECU 101 outputs a control signal for the power supply device 3 on the basis of a command signal received from the HV-ECU 102.

The HV-ECU 102 is configured to be capable of communicating with the battery ECU 101, and transmits and receives various signals of various commands, detection results of various sensors and the like. In order to generate vehicle driving power in accordance with a request of a driver during traveling of the vehicle 1, the HV-ECU 102 controls the engine 2, the first inverter 4a, and the second inverter 4b and controls the voltage of the power supply device 3. Various signals such as an operation signal IGCN of an ignition switch, a rotational frequency NE of the engine 2, rotational frequencies of the first electric motor 5a and the second electric motor 5b, a vehicle speed, an accelerator opening degree, a voltage Vh, a temperature Tb, and the SOC are input to the HV-ECU 102. Further, the HV-ECU 102 outputs a control signal NRef for the engine 2, signals PWM1 and PWM2 as pulse width modulation (PWM) control signals for the first inverter 4a and the second inverter 4b, a command signal for switching the voltage of the power supply device 3 to a requested voltage, a signal PWC as a PWM control signal for the switching element in the power supply device 3 and the like, which are calculated on the basis of the input information.

The battery ECU 101 and the HV-ECU 102 are physically constituted of an electronic circuit mainly composed of a well-known microcomputer including a central processing unit (CPU), a random access memory (RAM), a read only memory (ROM), and input and output interfaces. The functions of the battery ECU 101 and the HV-ECU 102 are achieved in a manner that the CPU causes an application program stored in the ROM to be loaded and executed in the RAM to operate a control target and performs reading and writing of data with respect to the RAM or the ROM.

Configuration of Power Supply Device

Next, the configuration of the power supply device 3 will be described with reference to FIG. 2.

Figure 2:
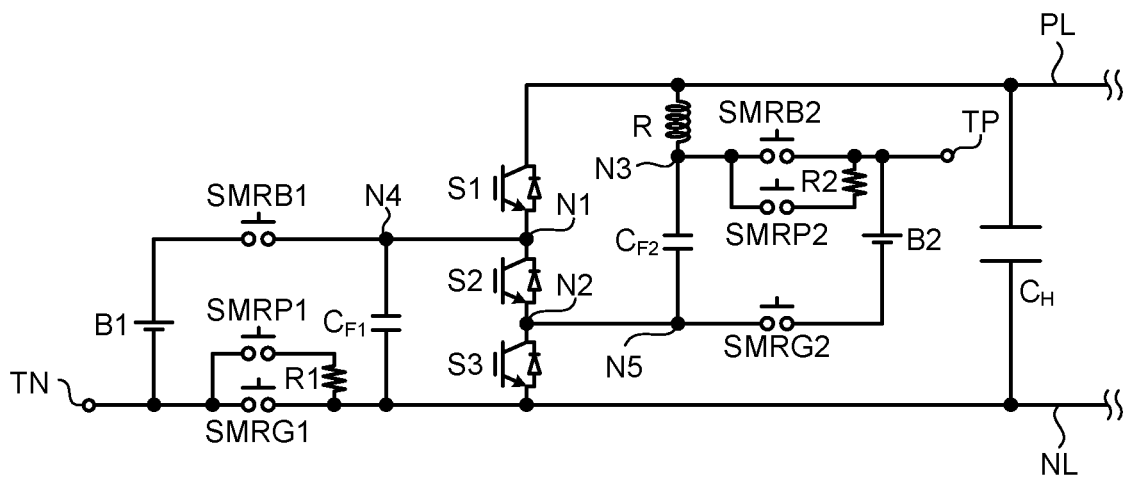
FIG. 2 is a circuit diagram illustrating an example configuration of the power supply device of FIG. 1.

FIG. 2 is a circuit diagram illustrating a configuration of the power supply device 3 of FIG. 1. As illustrated in FIG. 2, the power supply device 3 includes a first switching element S1 connected between the positive line PL and a first node N1, a second switching element S2 connected between the first node N1 and a second node N2, a third switching element S3 connected between the second node N2 and the negative line NL, and a smoothing capacitor $C_H$ connected between the positive line PL and the negative line NL.

The first switching element S1, the second switching element S2, and the third switching element S3 are constituted of semiconductor switching elements. As the semiconductor switching element, an insulated gate bipolar transistor (IGBT) is used. A diode (rectifying element) is connected between a collector terminal and an emitter terminal of the IGBT with the side connected to the emitter terminal as an anode. In a case where an element other than the IGBT is used as the semiconductor switching element, a diode is connected in parallel with the semiconductor switching element such that a current in a reverse direction to the current flowing when the switching element is conducted flows. The diode may be a parasitic diode associated with the semiconductor switching element. In this specification, a combination of the semiconductor switching element and the diode is called the switching element.

A positive electrode side relay SMRB1, a first battery B1, and a negative electrode side relay SMRG1, which are connected in series in order from a fourth node N4 side, and a capacitor $C_{F1}$ are connected in parallel between the fourth node N4 having the same potential as the first node N1, and the negative line NL. The first battery B1 is constituted of a chargeable and dischargeable secondary battery such as a lithium ion secondary battery or a nickel hydrogen secondary battery. The positive electrode of the first battery B1 is connected to the positive electrode side relay SMRB1 and the negative electrode of the first battery B1 is connected to the negative electrode side relay SMRG1. In addition, a negative electrode terminal for external charging TN is connected to the negative electrode of the first battery B1. Further, a resistive element R1 and a precharge relay SMRP1 which are connected in series are connected in parallel with the negative electrode side relay SMRG1.

A reactor element R is connected between the positive line PL and a third node N3. A positive electrode side relay SMRB2, a second battery B2, and a negative electrode side relay SMRG2, which are connected in series in order from the third node N3 side, and a capacitor $C_{F2}$ are connected in parallel between the third node N3 and a fifth node N5 having the same potential as the second node N2. The second battery B2 is constituted of a chargeable and dischargeable second battery same as the first battery B1. The positive electrode of the second battery B2 is connected to the positive electrode side relay SMRB2 and the negative electrode of the second battery B2 is connected to the negative electrode side relay SMRG2. In addition, a positive electrode terminal for external charging TP is connected to the positive electrode of the second battery B2. Further, a resistive element R2 and a precharge relay SMRP2 which are connected in series are connected in parallel with the positive electrode side relay SMRB2. The first battery B1 and the second battery B2 may be a capacitor.

In the power supply device 3, the battery ECU 101 executes precharging of the capacitor $C_{F1}$ and the capacitor $C_{F2}$ at the time of activation. Specifically, at the time of activation, the battery ECU 101 turns on the positive electrode side relay SMRB1 and the precharge relay SMRP1 and turns off the negative electrode side relay SMRG1. In this manner, power of the first battery B1 is supplied to the capacitor $C_{F1}$ in a state in which the voltage is adjusted by the resistive element R1, and thus the capacitor $C_{F1}$ is precharged. In addition, at the time of activation, the battery ECU 101 turns on the precharge relay SMRP2 and the negative electrode side relay SMRG2, and turns off the positive electrode side relay SMRB2. In this manner, power of the second battery B2 is supplied to the capacitor $C_{F2}$ in a state in which the voltage is adjusted by the resistive element R2, and thus the capacitor $C_{F2}$ is precharged.

In the power supply device 3, the battery ECU 101 controls the on/off state of the first switching element S1, the second switching element S2, and the third switching element S3 to switch the connection state of the first battery B1 and the second battery B2 between the series connection state, the parallel connection state, a single connection state of the first battery B1, and a single connection state of the second battery B2. Specifically, the battery ECU 101 controls the first switching element S1 and the third switching element S3 to be in an off state and the second switching element S2 to be in an on state so that the first battery B1 and the second battery B2 are connected in series (series connection state). In addition, the battery ECU 101 controls the first switching element S1 and the third switching element S3 to be in an on state and the second switching element S2 to be in an off state so that the first battery B1 and the second battery B2 are connected in parallel (parallel connection state). In addition, the battery ECU 101 controls the first switching element S1 to be in an on state and the second switching element S2 and the third switching element S3 to be in an off state so that power is supplied from only the first battery B1 (single connection state of the first battery B1). In addition, the battery ECU 101 controls the first switching element S1 and the second switching element S2 to be in an off state and the third switching element S3 to be in an on state so that power is supplied from only the second battery B2 (single connection state of the second battery B2). In this case, the smoothing capacitor $C_H$ smoothes the power flowing between the power supply device 3 and the inverters 4a and 4b.

In the power supply device 3 having the above-described configuration, the battery ECU 101 executes external charging processing described below to charge the first battery B1 and the second battery B2 by the external charger while suppressing an occurrence of inrush current at the time of connecting the external charger regardless of the connection state of the first battery B1 and the second battery B2. The operation of the battery ECU 101 when the external charging processing is executed will be described with reference to FIGS. 3 to 6. In the following description, it is assumed that all the elements are in an off state at the initial stage.

External Charging Processing
Parallel Charging

First, external charging processing in a case where the connection state of the first battery B1 and the second battery B2 is the parallel connection state will be described with reference to FIG. 3.

Figure 3:
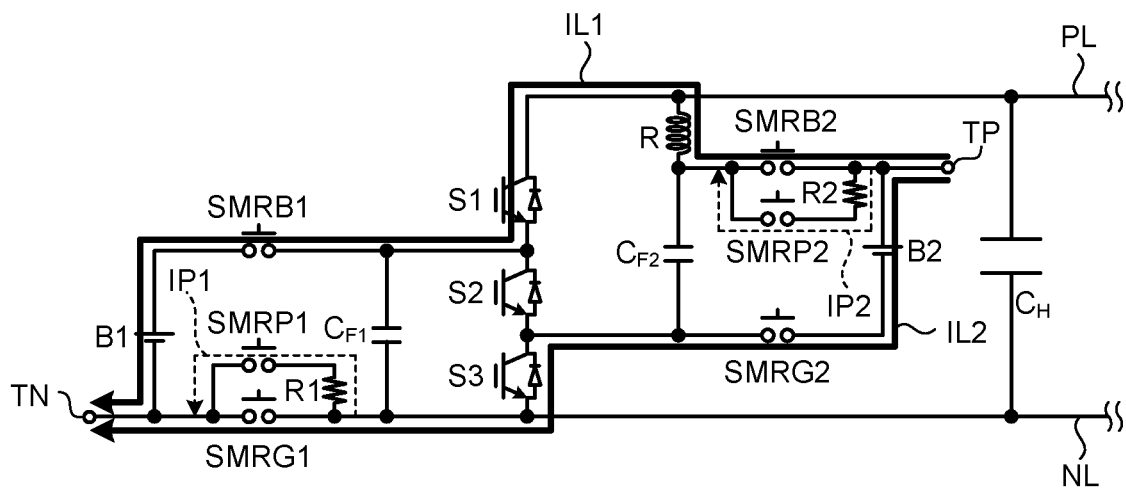
FIG. 3 is a diagram illustrating a current path during external charging in a case where a connection state of batteries is a parallel connection state.

FIG. 3 is a diagram illustrating a current path during external charging in a case where the connection state of the first battery B1 and the second battery B2 is the parallel connection state. As illustrated in FIG. 3, when the first battery B1 and the second battery B2 are charged by the external charger in a state where the connection state of the first battery B1 and the second battery B2 is the parallel connection state, first, the battery ECU 101 turns on the positive electrode side relay SMRB1 and the precharge relay SMRP1 and turns off the negative electrode side relay SMRG1 to precharge the capacitor $C_{F1}$. In addition, the battery ECU 101 turns on the precharge relay SMRP2 and the negative electrode side relay SMRG2 and turns off the positive electrode side relay SMRB2 to precharge the capacitor $C_{F2}$. Then, after the positive electrode terminal and the negative electrode terminal of the external charger are respectively connected to the positive electrode terminal for external charging TP and the negative electrode terminal for external charging TN, the battery ECU 101 controls the first switching element S1 and the third switching element S3 to be in an on state and the second switching element S2 to be in an off state so that the first battery B1 and the second battery B2 are connected in parallel. In this case, even when inrush current occurs, since the inrush current flows through current paths IP1 and IP2, the inrush current can be restricted by the resistive elements R1 and R2. Next, the battery ECU 101 turns on the positive electrode side relay SMRB1 and the negative electrode side relay SMRG1 and turns off the precharge relay SMRP1 to charge the first battery B1 by a charging current IL1 from the external charger. In addition, the battery ECU 101 turns on the positive electrode side relay SMRB2 and the negative electrode side relay SMRG2 and turns off the precharge relay SMRP2 to charge the second battery B2 by a charging current IL2 from the external charger. In this manner, the first battery B1 and the second battery B2 can be externally charged with the minimum configuration without using an additional device such as an external charging relay.

Series Charging

Next, external charging processing in a case where the connection state of the first battery B1 and the second battery B2 is the series connection state will be described with reference to FIG. 4.

Figure 4:
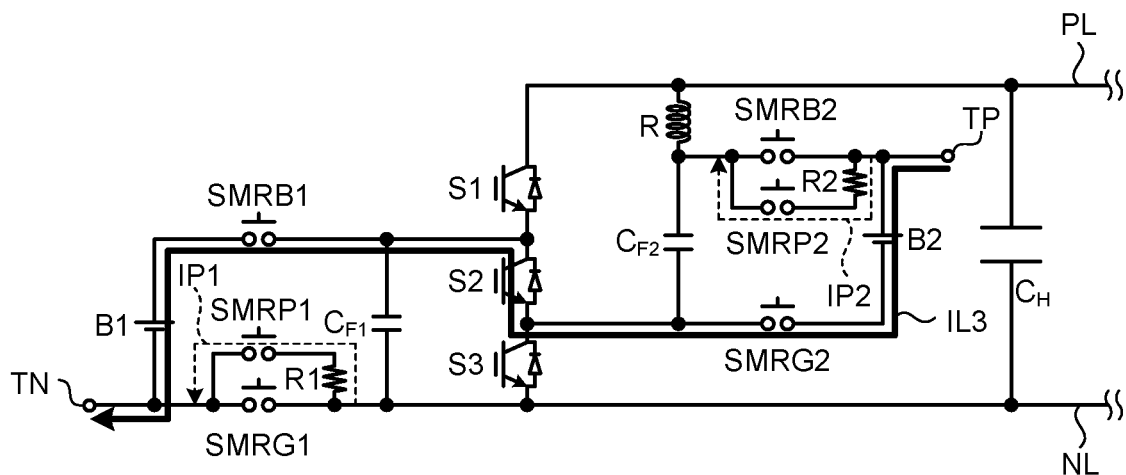
FIG. 4 is a diagram illustrating a current path during external charging in a case where the connection state of the batteries is a series connection state.

FIG. 4 is a diagram illustrating a current path during external charging in a case where the connection state of the first battery B1 and the second battery B2 is the series connection state. As illustrated in FIG. 4, when the first battery B1 and the second battery B2 are charged by the external charger in a state where the connection state of the first battery B1 and the second battery B2 is the series connection state, first, the battery ECU 101 turns on the positive electrode side relay SMRB1 and the precharge relay SMRP1 and turns off the negative electrode side relay SMRG1 to precharge the capacitor $C_{F1}$. In addition, the battery ECU 101 turns on the precharge relay SMRP2 and the negative electrode side relay SMRG2 and turns off the positive electrode side relay SMRB2 to precharge the capacitor $C_{F2}$. Then, after the positive electrode terminal and the negative electrode terminal of the external charger are respectively connected to the positive electrode terminal for external charging TP and the negative electrode terminal for external charging TN, the battery ECU 101 controls the first switching element S1 and the third switching element S3 to be in an on state and the second switching element S2 to be in an off state so that the first battery B1 and the second battery B2 are connected in parallel. In this case, even when inrush current occurs, since the inrush current flows through the current paths IP1 and IP2, the inrush current can be restricted by the resistive elements R1 and R2. Next, the battery ECU 101 controls the first switching element S1 and the third switching element S3 to be in an off state and the second switching element S2 to be in an on state so that the first battery B1 and the second battery B2 are connected in series. Next, the battery ECU 101 turns on the positive electrode side relay SMRB1 and the negative electrode side relay SMRG1 and turns off the precharge relay SMRP1. In addition, the battery ECU 101 turns on the positive electrode side relay SMRB2 and the negative electrode side relay SMRG2 and turns off the precharge relay SMRP2. In this manner, the first battery B1 and the second battery B2 can be externally charged by a charging current IL3 from the external charger with the minimum configuration without using an additional device such as an external charging relay.

Single Charging of First Battery B1

Next, external charging processing of the first battery B1 alone will be described with reference to FIG. 5.

Figure 5:
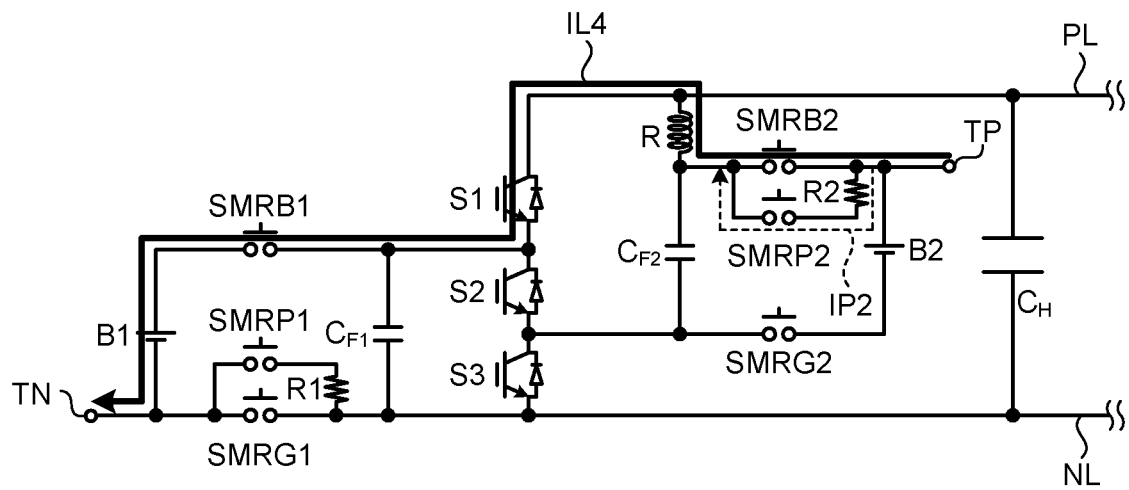
FIG. 5 is a diagram illustrating a current path during external charging of a first battery alone.

FIG. 5 is a diagram illustrating a current path during single charging of the first battery B1. As illustrated in FIG. 5, in a case where only the first battery B1 is charged since the voltage of the first battery B1 is lower than the voltage of the second battery B2, first, the positive electrode terminal and the negative electrode terminal of the external charger are respectively connected to the positive electrode terminal for external charging TP and the negative electrode terminal for external charging TN. Next, the battery ECU 101 turns on the precharge relay SMRP2 and the positive electrode side relay SMRB1 and then turns on the first switching element S1. In this case, even when inrush current occurs, since the inrush current flows through the current path IP2, the inrush current can be restricted by the resistive element R2. Next, the battery ECU 101 turns on the positive electrode side relay SMRB2 and turns off the precharge relay SMRP2. In this manner, the first battery B1 can be externally charged by a charging current IL4 from the external charger with the minimum configuration without using an additional device such as an external charging relay.

Single Charging of Second Battery B2

Finally, external charging processing of the second battery B2 alone will be described with reference to FIG. 6.

Figure 6:
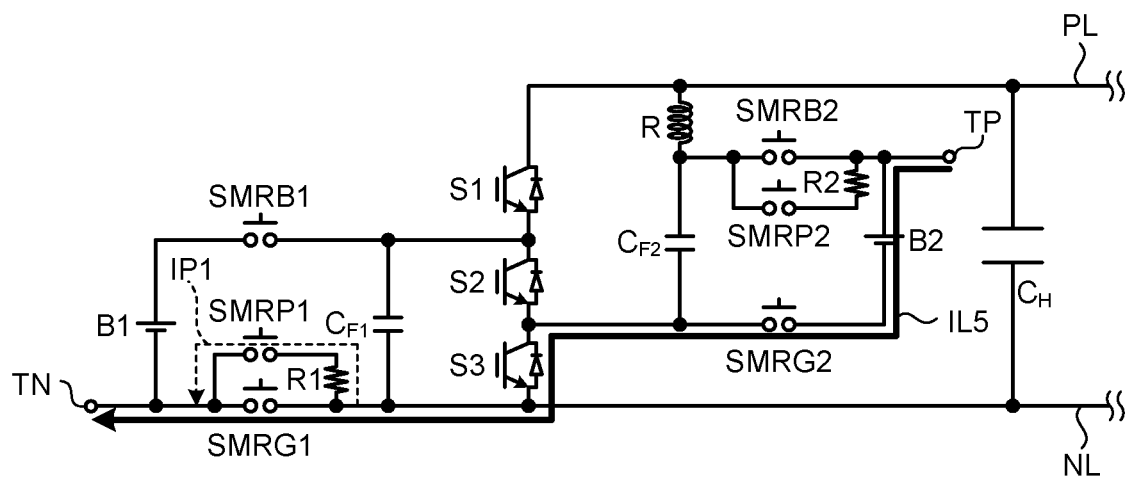
FIG. 6 is a diagram illustrating a current path during external charging of a second battery alone.

FIG. 6 is a diagram illustrating a current path during single charging of the second battery B2. As illustrated in FIG. 6, in a case where only the second battery B2 is charged since the voltage of the second battery B2 is lower than the voltage of the first battery B1, first, the positive electrode terminal and the negative electrode terminal of the external charger are respectively connected to the positive electrode terminal for external charging TP and the negative electrode terminal for external charging TN. Next, the battery ECU 101 turns on the negative electrode side relay SMRG2 and the precharge relay SMRP1 and then turns on the third switching element S3. In this case, even when inrush current occurs, since the inrush current flows through the current path IP1, the inrush current can be restricted by the resistive element R1. Next, the battery ECU 101 turns on the negative electrode side relay SMRG1 and turns off the precharge relay SMRP1. In this manner, the second battery B2 can be externally charged by a charging current IL5 from the external charger with the minimum configuration without using an additional device such as an external charging relay.

With the power supply device of a vehicle according to the present disclosure, it is possible to charge two batteries by an external charger while suppressing an occurrence of inrush current at the time of connection regardless of the connection state.

According to an embodiment, even when the connection state of the first battery and the second battery is the parallel connection state, it is possible to charge the first battery and the second battery by the external charger while suppressing the occurrence of the inrush current at the time of connection.

According to an embodiment, even when the connection state of the first battery and the second battery is the series connection state, it is possible to charge the first battery and the second battery by the external charger while suppressing the occurrence of the inrush current at the time of connection.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device of a vehicle, which includes a first switching element connected between a positive line and a first node, a second switching element connected between the first node and a second node, a third switching element connected between the second node and a negative line, a first battery having a positive electrode and a negative electrode respectively connected to the first node and the negative line, a reactor element connected between the positive line and a third node, a second battery having a positive electrode and a negative electrode respectively connected to the third node and the second node, and a smoothing capacitor connected between the positive line and the negative line, and switches an on/off state of the first switching element, the second switching element, and the third switching element to switch a connection state of the first battery and the second battery between a series connection state and a parallel connection state, the power supply device comprising:

a negative electrode terminal for external charging connected to the negative electrode of the first battery;

a positive electrode terminal for external charging connected to the positive electrode of the second battery;

a first positive electrode side relay provided between the first node and the positive electrode of the first battery;

a first capacitor connected between the first node and the negative line;

a first negative electrode side relay provided between the negative electrode of the first battery and the negative line;

a first precharge relay and a first resistive element which are connected in parallel with the first negative electrode side relay;

a second positive electrode side relay provided between the third node and the positive electrode of the second battery;

a second capacitor connected between the third node and the second node;

a second negative electrode side relay provided between the negative electrode of the second battery and the second node; and a second precharge relay and a second resistive element which are connected in parallel with the second positive electrode side relay.

2. The power supply device of a vehicle according to claim 1, further comprising: a control unit configured to, when the first battery and the second battery are externally charged in a case where the connection state of the first battery and the second battery is the parallel connection state, control the connection state of the first battery and the second battery to be the parallel connection state by causing the first positive electrode side relay and the first precharge relay to be in an on state, the first negative electrode side relay to be in an off state, the second precharge relay and the second negative electrode side relay to be in an on state, and the second positive electrode side relay to be in an off state and connecting an external charger to the negative electrode terminal for external charging and the positive electrode terminal for external charging, and cause the first positive electrode side relay and the first negative electrode side relay to be in an on state, the first precharge relay to be in an off state, the second positive electrode side relay and the second negative electrode side relay to be in an on state, and the second precharge relay to be in an off state.

3. The power supply device of a vehicle according to claim 1, further comprising: a control unit configured to, when the first battery and the second battery are externally charged in a case where the connection state of the first battery and the second battery is the series connection state, control the connection state of the first battery and the second battery to be the parallel connection state by causing the first positive electrode side relay and the first precharge relay to be in an on state, the first negative electrode side relay to be in an off state, the second precharge relay and the second negative electrode side relay to be in an on state, and the second positive electrode side relay to be in an off state, and connecting an external charger to the negative electrode terminal for external charging and the positive electrode terminal for external charging, control the connection state of the first battery and the second battery to be the series connection state, and cause the first positive electrode side relay and the first negative electrode side relay to be in an on state, the first precharge relay to be in an off state, the second positive electrode side relay and the second negative electrode side relay to be in an on state, and the second precharge relay to be in an off state.

* * * * *